United States Patent
Knoesen et al.

[11] Patent Number: 6,047,095
[45] Date of Patent: Apr. 4, 2000

[54] IN-LINE POLYMERIC CONSTRUCT FOR MODULATORS, FILTERS, SWITCHES AND OTHER ELECTRO-OPTIC DEVICES

[75] Inventors: Andre Knoesen; Diego Yankelevich; Scott A. Hamilton; Nicholas L. Abbott, all of Davis; Richard A. Hill, Campbell; Gary Bjorklund, Los Altos Hills, all of Calif.

[73] Assignees: The Regents of the University of California, Oakland; Optical Networks, Incorporated, Palo Alto, both of Calif.

[21] Appl. No.: 09/219,300

[22] Filed: Dec. 21, 1998

Related U.S. Application Data

[62] Division of application No. 08/683,056, Jul. 16, 1996, Pat. No. 5,854,864.

[51] Int. Cl.$^7$ ........................................ G02B 6/26
[52] U.S. Cl. ............................... 385/30; 438/29
[58] Field of Search ....................... 385/2, 3, 8, 9, 385/10, 30, 123; 438/29, 30, 31, 32, 33

[56] References Cited

U.S. PATENT DOCUMENTS

| | | | |
|---|---|---|---|
| 3,916,510 | 11/1975 | Martin . | |
| 4,915,482 | 4/1990 | Jannson et al. | 385/147 |
| 5,060,307 | 10/1991 | El-Sherif | 359/173 |
| 5,067,788 | 11/1991 | Jannson et al. . | |
| 5,359,678 | 10/1994 | Heismann et al. | 385/1 |
| 5,729,641 | 3/1998 | Chandonnet et al. . | |
| 5,854,864 | 12/1998 | Knoesen et al. | 385/30 |

OTHER PUBLICATIONS

Creany et al., "Continuous–Fiber Modulator With High–Bandwidth Coplanar Strip Electrodes", IEEE Photonics Letters, vol. 8, No. 3, pp. 355–357, Mar. 1996.

*Primary Examiner*—Akm E. Ullah
*Attorney, Agent, or Firm*—John P. O'Banion

[57] ABSTRACT

A coplanar waveguide polymeric in-line fiber construct (CPW-PILF) formed on an optic half coupler substrate base or D-fiber wherein the surface is polished down through the cladding on the optical fiber so as to form an evanescent coupling region on the surface. Co-planar, spaced-apart electrodes are deposited on the surface with their gap aligned over the coupling region, and an electro-optic (EO) polymeric waveguide is deposited over the electrodes and between the electrode gap. Light transmitted thorough the optical fiber is evanescently coupled to said waveguide and modulated by a signal applied to the electrodes. Alternatively, the waveguide is deposited on the surface of the substrate and the electrodes are deposited over the waveguide.

8 Claims, 10 Drawing Sheets

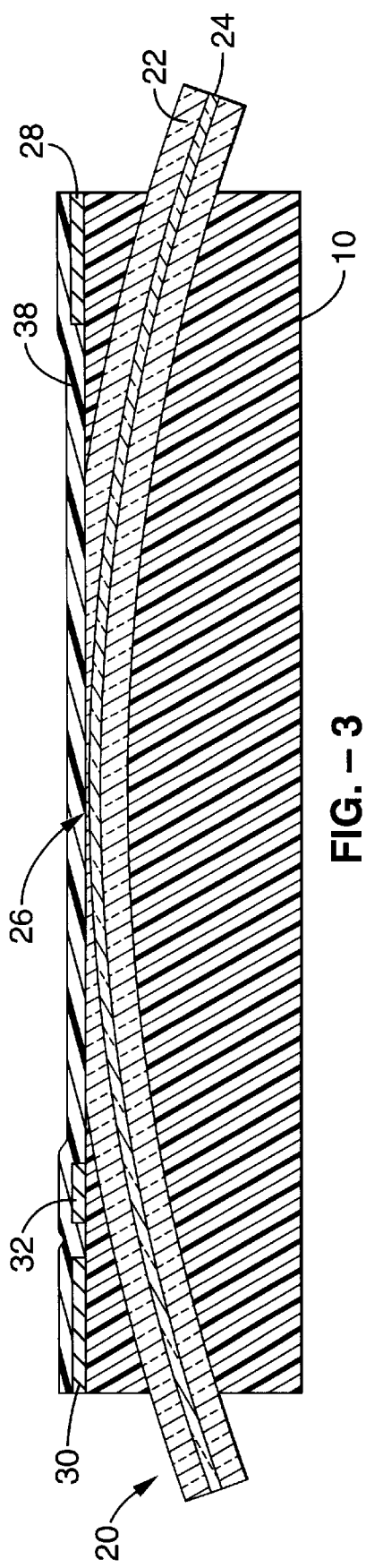
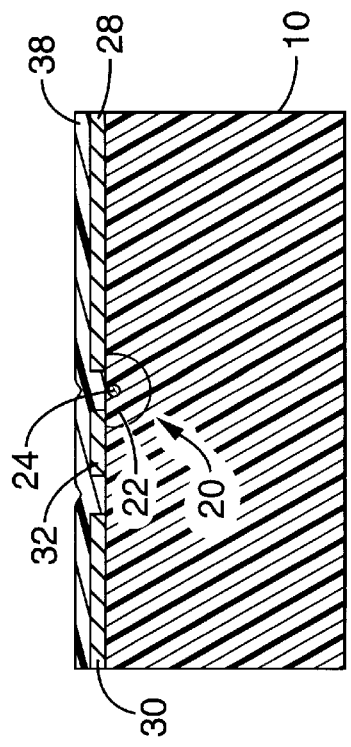
FIG. -3
FIG. -4

IN-LINE POLYMERIC CONSTRUCT FOR MODULATORS, FILTERS, SWITCHES AND OTHER ELECTRO-OPTIC DEVICES

CROSS-REFERENCE TO RELATED APPLICATIONS

This application is a divisional of application Ser. No. 08/683,056 filed on Jul. 16, 1996 now U.S. Pat. No. 5,854,864.

BACKGROUND OF THE INVENTION

1. Field of the Invention

This invention pertains generally to electro-optic devices, and more particularly to an in-line polymeric fiber construct suitable for fabrication of electro-optic devices such as high speed modulators, tunable wavelength filters, and space division switches.

2. Description of the Background Art

Much of the external optical modulator technology in use today is based on integrated optic lithium niobate devices. An example is a lithium niobate amplitude modulator which is typically based on a Mach-Zehnder interferometer structure, and which has demonstrated half-wave voltages of <5 V at frequencies of <5 GHz. However, despite further development over many years, lithium niobate integrated optic modulators exhibit excessive insertion loss, are expensive and bulky, are not mechanically rugged, and exhibit high intermodulation distortion (IMD). Further, due to the fundamental mismatch in the phase velocity of radio-frequency and optical waves in lithium niobate, such modulators tend to require excessive drive power at high frequencies.

Improved electro-optic (EO) materials, however, are gaining popularity for advanced photonic devices such as efficient high speed modulators, rapidly tunable filters for wavelength division multiplexing (WDM), and low switching voltage directional couplers for space division switching. Due to their cost and fabrication advantages, EO polymers are leading candidate materials for these applications. However, for EO polymers to be used as a replacement for lithium niobate in standard integrated optics devices, it is necessary for the EO polymers to be stable for brief exposure to 250° C., to have an EO coefficient of greater than 30 pm/V, and to have a loss of less than 1 dB/cm. While there has been significant progress on improving the temperature stability of EO polymer materials, there is no presently available EO polymer material that simultaneously satisfies the high EO coefficient and low loss requirement of such devices.

Conventional polymeric and lithium niobate based devices that take advantage of evanescent coupling have been developed to alleviate problems associated with the pigtailing of integrated optics devices. Because such devices rely on evanescent coupling to the electro-optic material, rather than propagation through it, insertion losses are greatly reduced and a mechanically rugged, self-pigtailed device can be fabricated. However, assembly has been complicated due to the difficulties of working with devices with attached fibers, and development of high speed devices has been limited.

Accordingly, there is a need for a device technology that permits the use of EO polymers as an alternative to lithium niobate notwithstanding the current deficiencies in EO polymers, and which provides a more facile path for near-term insertion of EO polymers into applications such as high speed modulators, tunable wavelength filters, and space division switches. The present invention satisfies those needs, as well as others, and provides for a new region of parameter space for EO polymer materials development.

SUMMARY OF THE INVENTION

The foregoing needs are satisfied by the polymeric in-line fiber (PILF) device technology of the present invention which overcomes the performance deficiencies of conventional waveguide electro-optic devices. In general terms, the present invention comprises an optic fiber half coupler substrate, spaced-apart co-planar electrodes which are deposited on the substrate, and a multimode waveguide overlay comprising an EO polymer whose index of refraction is controlled by a modulating signal or control signal applied to the electrodes. The coplanar electrodes form a transmission line and are connected to a microwave source using coaxial connectors, waveguides, wire bonding or other conventional means.

By way of example, and not of limitation, the fiber half-coupler comprises a translucent polished glass block with an embedded single mode optical fiber. The top surface of the glass block is polished down through the fiber cladding nearly to the fiber core, enabling the evanescent fields in the fiber to interact with the waveguide overlay. The electrodes are deposited on the polished surface of the glass block using photolithographic techniques after aligning the gap between the electrodes over the fiber core. This is done by sending light down the fiber, aligning the mask using the light emitted through the polished-away portion of the cladding while simultaneously illuminating the mask through the fiber half-coupler from the back side with light that will not expose the photoresist, and then exposing the photoresist through the mask with a separate light source.

Finally, the polymer layer is overlayed onto the electrode layer such that it extends into the electrode gap. This can be accomplished using a variety of techniques, such as spin coating, but preferably a lift-off decal process is employed. The lift-off decal process involves several steps. First, a release layer and EO polymer layer are spin coated onto a temporary substrate. The polymer layer is then cut to the desired size and released from the temporary substrate by dissolving the release layer. The released polymer layer is then overlayed onto the electrode layer. Due to the self-pigtailed construction of the fiber half-coupler, spin coating is possible, but difficult, and could result in irreversible damage to the embedded fiber. The lift-off decal process, however, allows the deposition of a high-quality EO polymer film onto a structure without subjecting it to spin coating or other processing steps that may damage the device, and allows for reliable deposition of films of identical thickness onto different devices.

Operation of the device is based on electro-optical control of the evanescent coupling of light from the optical fiber core to the polymer waveguide overlay. This coupling occurs efficiently for wavelengths of light that have the same effective index of refraction in the fiber as in the polymer waveguide overlay. The coupling to the polymer waveguide overlay depletes the intensity of a band of wavelengths in the fiber centered around the coupling wavelength. This causes a sharp narrow dip in the optical fiber transmission spectrum with a center wavelength that can be electro-optically tuned, since the phase matching wavelength is a function of the polymer waveguide index of refraction.

Light at certain wavelengths is evanescently coupled out of the fiber core into the polymer layer. Because the optical fiber runs through the device without interruption, the device is "self-pigtailed". In addition, the device has low insertion loss, high mechanical ruggedness, low manufacturing cost, has lower IMD than Mach-Zehnder devices, and can be fabricated with modulation bandwidths of 50 GHz or more. In particular, the short interaction length characteristic of the device makes it possible to tolerate absorption losses in the EO polymer as high as 100 dB/cm and provides for using resonant enhancement of the optical non-linearity to boost the achievable EO response. With resonant enhancement, EO coefficients in excess of 100 pm/V may be possible. Furthermore, the device technology of the present invention does not require polymeric buffer layers or channel waveguides that are necessary for conventional EO polymer waveguide devices. The properties of the present invention make it particularly well suited to the needs of wideband microwave fiber optic links and photonically controlled phased array antenna applications.

An object of the invention is to reduce optical losses by aligning the electrode gap over the fiber core.

Another object of the invention is to avoid placement of lossy electrodes in the optical path.

Another object of the invention is to minimize optical losses and to maximize modulation.

Another object of the invention is to provide for light interaction with the largest electro-optic coefficient.

Another object of the invention is to provide for the use of resonantly enhanced nonlinear polymers in electro-optic modulators.

Another object of the invention is to provide for a self-pigtailed design that is rugged, has low insertion losses, and has a low fabrication cost.

Another object of the invention is to provide a compact, integratable device.

Another object of the invention is to provide for high frequency performance.

Another object of the invention is to provide for low radio frequency (RF) loss transition to high frequency connectors.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 3 is a cross-sectional view of the apparatus shown in FIG. 2 taken through line 3—3.

FIG. 4 is a cross-sectional view of the apparatus shown in FIG. 2 taken through line 4—4.

DESCRIPTION OF THE PREFERRED EMBODIMENTS

Figure 1:
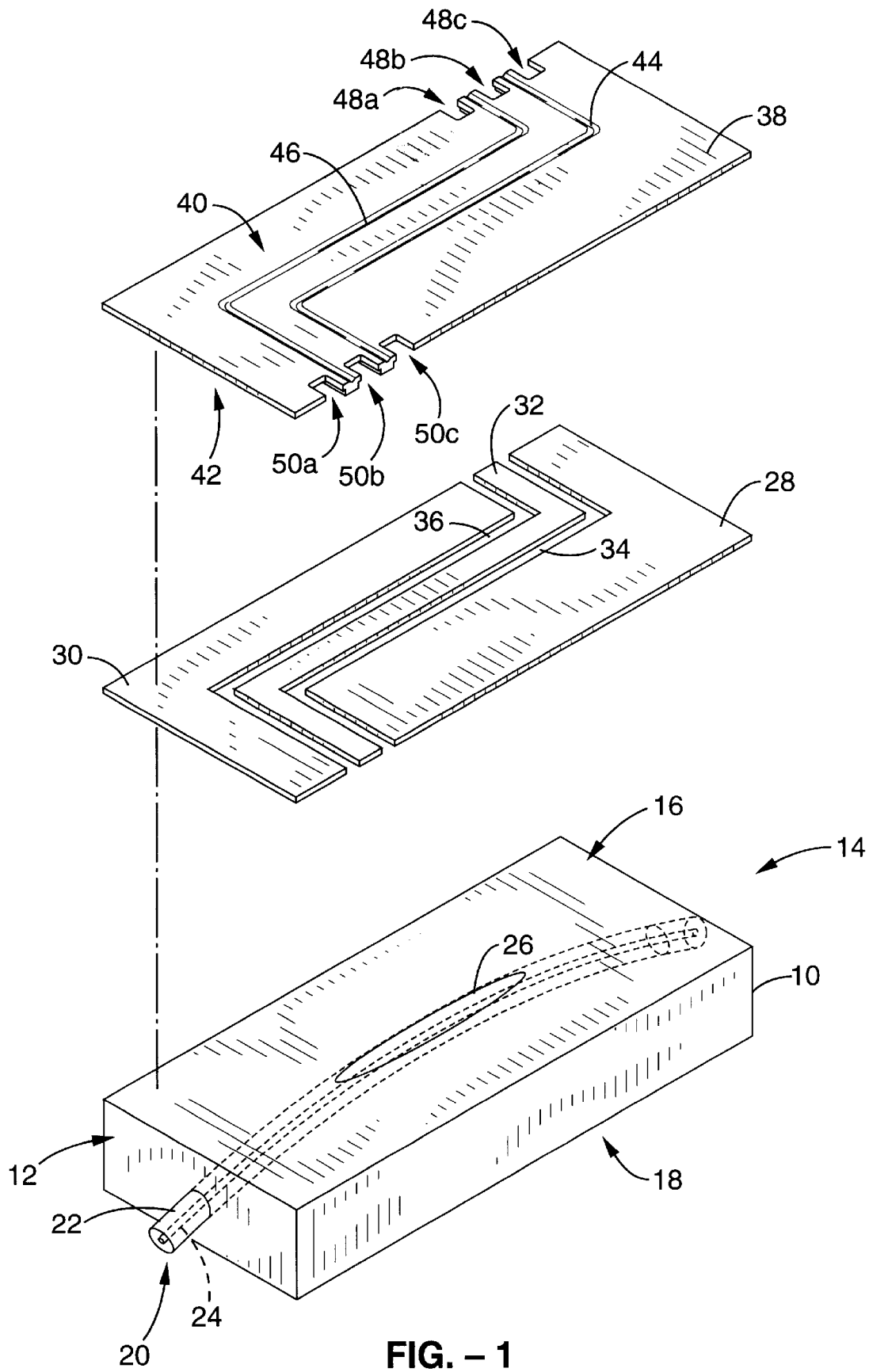
FIG. 1 is an exploded view of an in-line polymeric electro-optic construct in accordance with the present invention.
Figure 2:
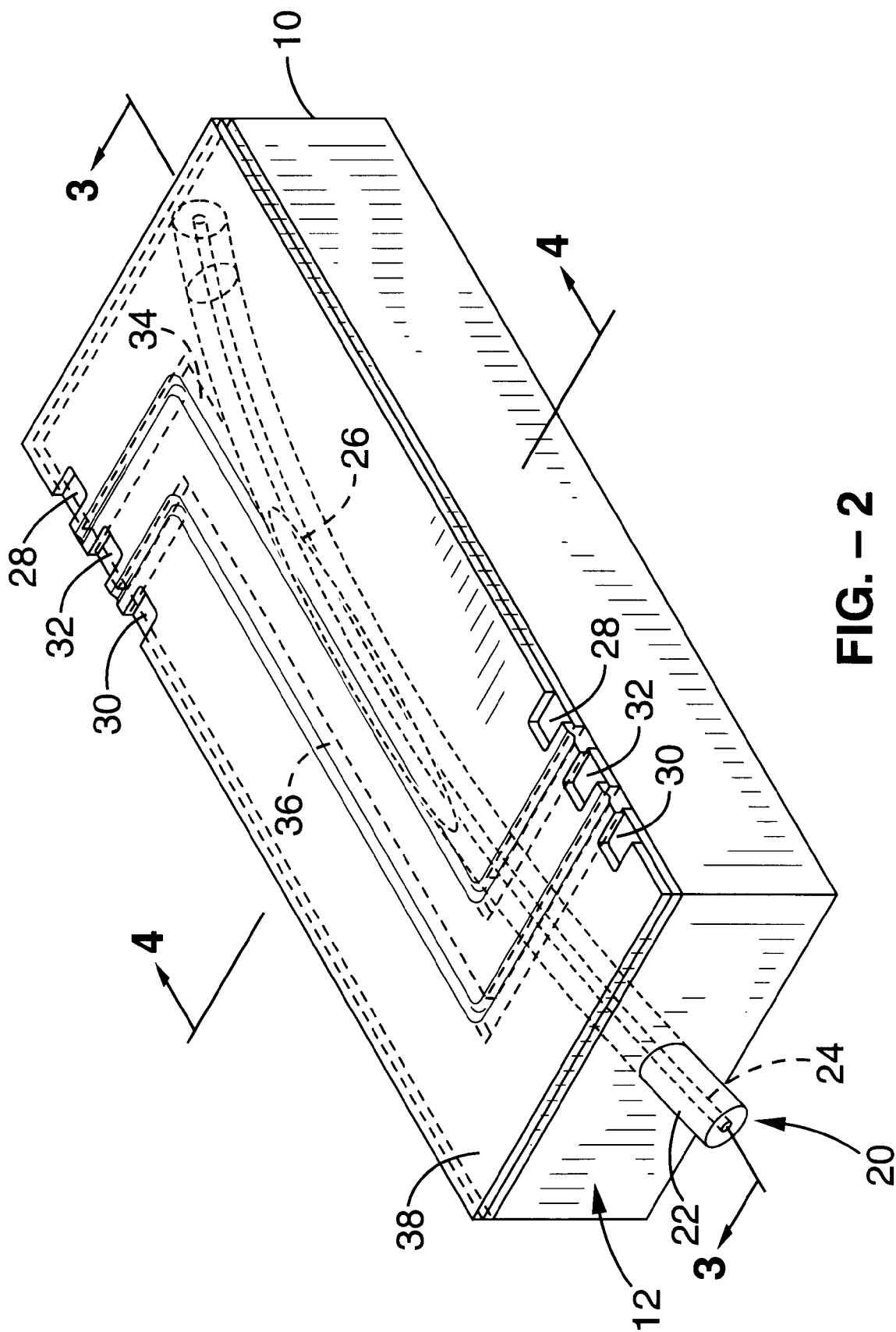
FIG. 2 is an assembled view of the apparatus shown in FIG. 1.

Referring more specifically to the drawings, for illustrative purposes the present invention is embodied in the apparatus which is generally shown in FIG. 1 through FIG. 5, FIG. 7 and FIG. 9 where like reference numerals denote like parts, and which is described with reference to figures as well as with reference to FIG. 6, FIG. 8, FIG. 10 through FIG. 12. It will be appreciated that the apparatus may vary as to configuration and as to details of the parts, and that fabrication methods may vary as to their steps and sequence, without departing from the basic concepts as disclosed herein.

Referring first to FIG. 1 through FIG. 4, it can be seen that the present invention comprises a layered assembly on a substrate base 10, typically glass, that has first and second ends 12, 14, respectively, and top and bottom surfaces 16, 18, respectively. The substrate base 10 is a conventional fiber half-coupler, such as an SMF-28 fiber TC block available from Canadian Instrumentation and Research, having a single mode optical fiber 20 extending between ends 12, 14 and positioned arcuately between surfaces 16, 18 so as to have a central point in closer proximity to top surface 16 than to bottom surface 18. Alternatively, a commercially available "D-fiber" could be used. Optical fiber 20 is a conventional single mode optical fiber or the like, typically glass, having an outer cladding 22 and an inner core 24. Typically, the length of substrate base 10 is approximately one to three centimeters, the height is in the range of approximately 0.2 cm to 0.4 cm, and the width is in the range of approximately 0.4 cm to 0.6 cm. The outer diameter of optical fiber 20 is typically approximately 125.0 Tm, and the diameter of inner core 24 is typically approximately 9.0 Tm.

In a typical fiber half-coupler, surface 16 is a planar surface that has been polished using conventional techniques until a portion of the outer cladding 22 of optical fiber 20 is removed to within approximately 2.0 Tm of inner core 24. Therefore, a planar surface is maintained wherein the cladding is contiguous with the substrate surface. As a result, the cladding is exposed in an elliptical region approximately 100.0 Tm wide and 5.0 mm long which will permit the escape of light transmitted through inner core 24. The transfer of optical power will occur in a centrally located optical coupling region 26 which is approximately 9.0 Tm wide and 1.0 mm long where inner core 24 is closest to surface 16. It will be appreciated that variations in the radius of curvature of optical fiber 20 will cause the length of coupling region 26 to vary.

At least two spaced-apart electrodes are deposited onto surface 16 of base 10. In the embodiment shown, there are two ground electrodes 28, 30 and a signal electrode 32. While only one ground electrode is required, using two ground electrodes as shown establishes ground plane symmetry and provides for lower RF signal loss. These electrodes, typically comprising gold or like materials suitable for use at high frequencies, are deposited onto surface 16 using conventional metal deposition, lithographic patterning and electro-plating techniques. However, proper alignment in relation to coupling region 26 is essential.

As can be seen, electrodes 28 and 32 are spaced-apart so as to establish an electrode gap 34. Similarly, electrodes 30 and 32 are spaced-apart so as to establish an electrode gap 36. Only one of these electrode gaps needs to be aligned, however. In the embodiment shown, electrode gap 34 is aligned in relation to coupling region 26; that is, the longitudinal axis of electrode gap 34 is centered over the longitudinal axis of coupling region 26. Electrode alignment over coupling region 26 is an essential aspect of the invention. The process employed for electrode deposition and alignment is described below.

An electro-optic (EO) polymer layer 38 overlays the electrode layer. As can be seen, both surfaces of EO polymer layer 38 are not necessarily planar. While the outer surface 40 can be planar, it is typically depressed in the region of electrode gaps 34, 36. Additionally, the inner surface 42 includes extended portions 44, 46 which conform to the topology of electrode gaps 34, 36, respectively. In other words, the polymer layer extends into and preferably fills the electrode gaps as shown. It will be appreciated, however, that it is not necessary to completely fill the electrode gaps, so long as the portion of polymer layer 38 that extends into the electrode gap that is aligned over coupling region 26 is in contact with surface 16. Conformality of polymer layer 38 to the topology of the electrode layer so as to contact surface 16 is necessary to achieve proper coupling between optic fiber 20 and polymer layer 38 in the region of the electrode gap 34 where the electric field is the strongest. A plurality of connection recesses 48a, 48b, 48c and 50a, 50b, 50c are cut out of polymer layer 38 to provide access to the electrodes for electrical connection.

While polymer layer 38 comprises a compliant material and will essentially fall into the electrode gaps, a vacuum could be pulled to aid in the conformation of the polymer layer to the electrode gaps. It will be appreciated that, if spin coating was used for deposition of the polymer layer, electrode gaps 34, 36 would be filled without the need for using a vacuum; still, however, the upper surface of polymer layer 38 would likely be depressed in the area of the electrode gaps.

Figure 5:
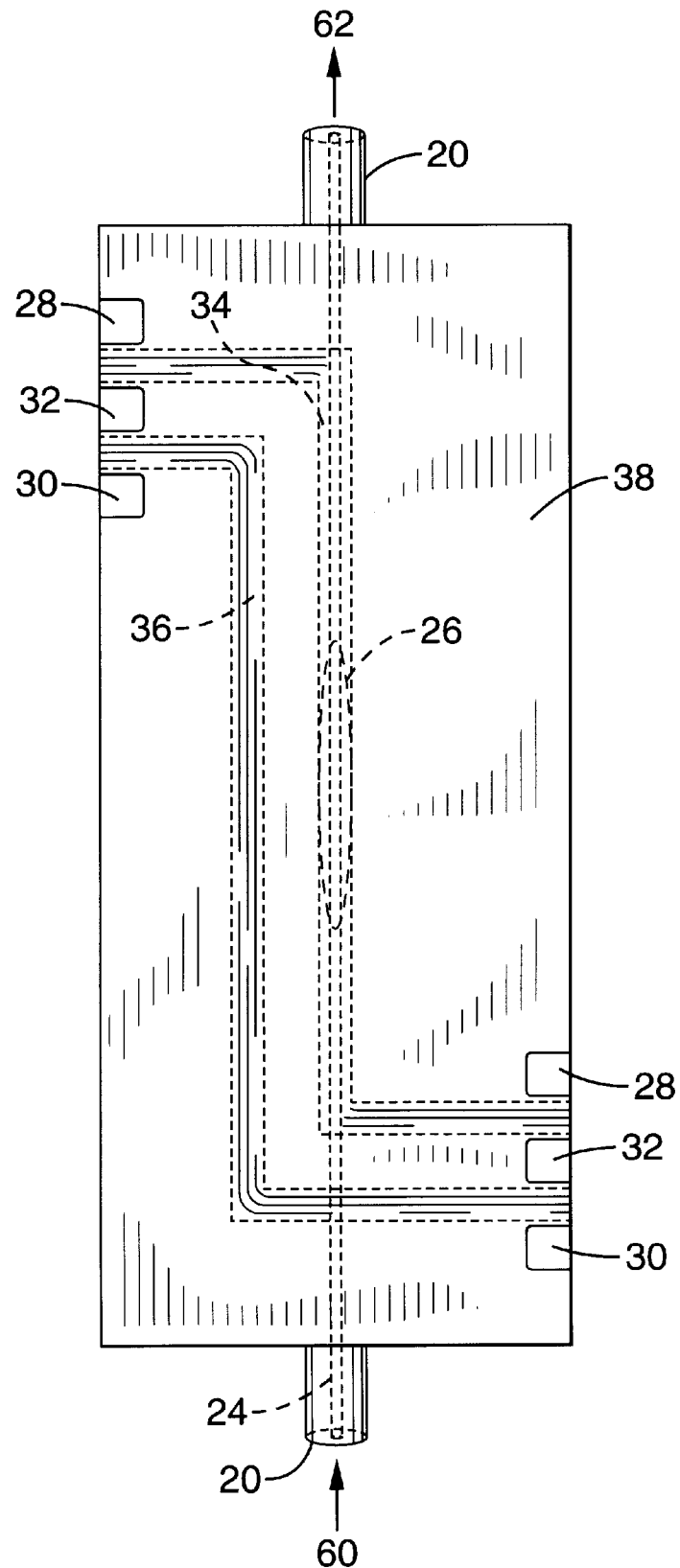
FIG. 5 is a top plan view of the apparatus shown in FIG. 2.

Referring also to FIG. 5, fabrication of the invention generally proceeds as follows. Those skilled in the art will appreciate that the steps presented herein are illustrative only, and that the details of steps may vary and that their sequence may proceed in a different order. Furthermore, it will be appreciated that, while the following process builds upon the substrate base 10, it is also possible to fabricate the device on a sacrificial substrate base and then transfer the completed electrode/polymer assembly to the half-coupler or D-fiber as the actual substrate base.

First, the substrate base 10 is prepared by polishing surface 16 using conventional techniques until outer cladding 22 has been removed to within approximately 2.0 Tm of inner core 24. The nominal range can be from approximately zero to 10.0 Tm, with the goal of (i) not damaging inner core 24 and (ii) being sufficiently close to inner core 24 as to allow light transmitted through optic fiber 20 to pass through surface 16 for evanescent coupling between inner core 24 and polymer layer 38 through coupling region 26. These steps are normally carried out in the commercial manufacture of the optic fiber half coupler or D-fiber.

Next, coplanar electrodes 28, 30 and 32 are deposited onto surface 16 of substrate base 10 using conventional metal deposition, lithographic patterning and electroplating techniques. Preferably the electrodes have a nominal thickness of 3.0 Tm to 5.0 Tm to avoid RF losses, but their thickness can vary. It will be appreciated, however, that thicker electrodes will provide lower losses than thinner electrodes, and that a thickness of approximately 0.5 Tm will be too lossy for practical applications. Additionally, electrode gaps 34, 36 typically have a width on the order of approximately 10.0 Tm and a length on the order of approximately 1.0 mm for an overall device length of approximately 1.0 cm to 3.0 cm. The length of the electrode gaps should preferably be the same as or longer than the length of coupling region 26. The electrodes are preferably made of metals such as gold to allow high speed electrode structures to be realized.

As indicated previously, in the embodiment shown electrode gap 34 is aligned over coupling region 26. To achieve proper alignment, light is transmitted through optical fiber 20 and the mask (not shown) is backlighted through the translucent substrate base 10 with a light directed toward bottom surface 18, the mask is aligned using the light emitted through coupling region 26 as a guide, and the photoresist is exposed. In this regard, it will be noted that the light used for backlighting should have a wavelength which does not expose the photoresist, such as 550 nm or greater.

Next, the polymer layer 38 is prepared. Polymer layer 38 comprises a material that will conform to the topology of the electrodes and extend into or fill the gaps in-between. Preferably, the material is an electro-optic, resonantly enhanced non-linear material. While the material can be any compliant electro-optic material, an EO polymer is preferred.

If desired, polymer layer 38 can be prepared in-situ using spin coating techniques. For example, spin coating casting of the polymer layer 38 onto substrate base 10 would typically be performed in the following manner. Filtered nonlinear polymer spinning solution is deposited at the center of a spinning substrate base 10 using a holder which is preferably fabricated to securely hold the substrate base 10 at spinning speeds in excess of 7000 rpm. The holder includes a spool to coil the optical fiber 20 under the plane where the fiber surface 16 is spinning. Typical spinning speeds are in the range of 2000 rpm to 4000 rpm. Very high spinning speeds can damage the optical fibers and, therefore, the lower spinning speeds are preferred. The polymer layer 38 thickness is affected by the polymer solution viscosity, angular velocity, spin time, surface topology, and length of time to attain speed. In addition, the amount of spinning solution is metered and viscosity and spinning speed controlled to prevent "beading" at the perimeter of the block. Although most of the solvent is evaporated during the spin coating deposition the remaining solvent must be removed by baking the polymer layer 38 under vacuum at an elevated temperature. The last step is preferred to obtain a long term stability of the nonlinearity.

While polymer layer 38 could be prepared in-situ by spin coating as described above, polymer layer 38 is preferably prepared according to a lift-off decal process in accordance with the invention. The lift-off decal process of preparing polymer layer 38 typically comprises the following steps. First, a release layer is applied to a temporary substrate and the polymer layer is spin coated to the desired thickness, with the thickness being controlled by the spin speed and viscosity of the material being spin coated. While the thickness of polymer layer 38 is typically on the order of approximately 3.0 Tm, it can vary from approximately 1.0 Tm to 5.0 Tm depending upon the operating wavelength of the particular device. Films with thicknesses in this range can be achieved on a variety of temporary substrates such as glass, silicon and even multi-layered structures of polymers.

The release layer typically comprises a water soluble polymer such as polyacrylic acid (PAA) or the like which is deposed between the temporary substrate and the polymer layer. Following spin coating and measurement of the polymer layer, the polymer layer is cut to the desired size and released from the temporary substrate by dissolving the PAA release layer. Once released, the polymer layer is then overlayed onto the coplanar electrode layer on the previously prepared half-coupler substrate. A self-assembled monolayer is used to adhere the polymer layer to the electrodes, and a vacuum is preferably drawn so that the polymer will conform to the topology of the electrodes and fill the electrode gaps. By heating the polymer to its glass transition temperature, the polymer will be pliant and air in the electrode gaps will diffuse through the material. While the polymer will likely be soft enough so as to fall into the electrode gaps, a vacuum is preferred so that a high degree of conformation can be achieved.

As can be seen, therefore, the polymer lift-off deposition procedure of the present invention enables the preparation of a high quality polymer film before it is deposited onto the electrodes, and provides for fabrication of devices with predetermined film thicknesses. It will also be appreciated that a single film could be prepared and cut into multiple segments having identical characteristics for fabricating multiple devices.

Whether polymer layer 38 is deposited by spin coating or the lift-off decal process, reactive ion etching (RIE) is preferably used for trimming the polymer layer 38 to the desired thickness. To do so, a negative self-bias DC voltage is developed between a plasma energized by an RF generator and the sample electrode to accelerate ions from the plasma to the target sample. Etching is performed by the combined action of free radicals and ions accelerated to the target surface. Part of the etching is achieved by ions chemically reacting at the surface, and part is by the physical removal of material when it is struck by the incoming ion (sputtering).

The transmittance minima wavelength is directly related to the thickness of the polymer layer 38. Therefore, in-situ thickness monitoring is possible by observing the transmittance spectrum through the optical fiber 20 during etching. When the maximum slope region of the transmittance dip is at the design wavelength, the RIE is deactivated. Vacuum optical feedthroughs give access to the RIE vacuum chamber.

Figure 6:
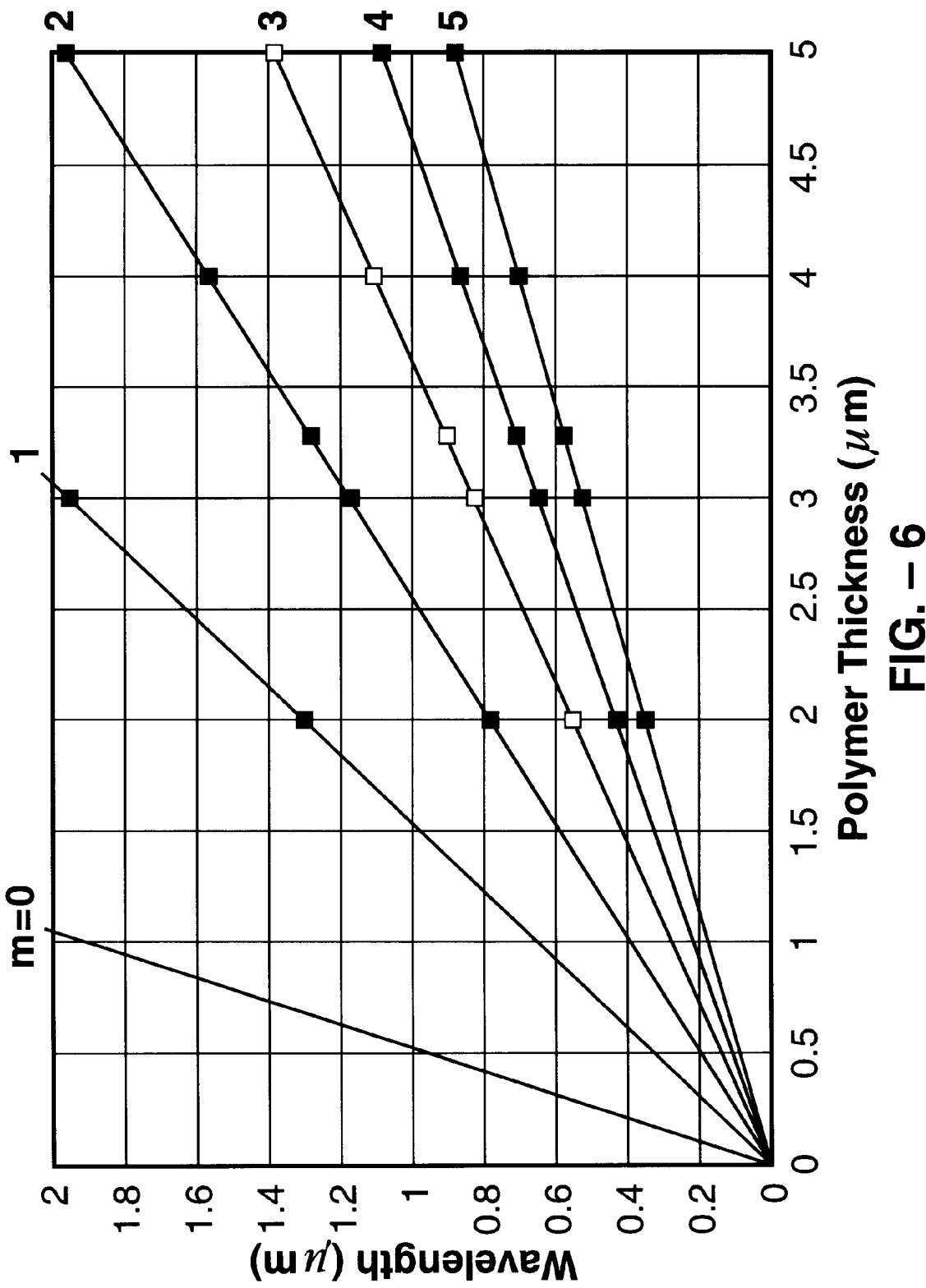
FIG. 6 is a graph showing operating wavelength as a function of polymer thickness for multiple modes.

As can be seen in FIG. 6, the thickness of polymer layer 38 and the operating wavelength of a modulator in accordance with the present invention are inter-related. The polymer layer is generally thick enough to support multiple optical modes, which are labeled in FIG. 6 as m=0 to m=5. Therefore, for a given operating wavelength, there are multiple polymer layer thicknesses that can be employed, depending on which mode is chosen. For example, where m=2, an operating wavelength of approximately 1.3 Tm would require a polymer layer thickness of approximately 3.0 Tm.

The noncentrosymmetry that is required for EO activity is introduced by electric field poling of thin polymeric films. Poling is used to orient the material by conventional techniques such as heating the material and then applying an electric field, but alternatively the material is photo-poled by flooding the top with light and then applying an electric field. Contact poling is most suitable for the modulator structure described herein since the nonlinear chromophores must be aligned parallel to the plane of the film. An alternative poling technique is corona poling, which orients the nonlinear chromophores perpendicular to the plane of the film and, although a larger poling field is possible, it has not been tested in the structure described herein.

After deposition of the nonlinear polymer, a high voltage would be applied to electrodes 28 and 32. During this poling step, the entire structure would be immersed into a silicon oil bath to prevent dielectric breakdown in the area above and between the electrodes that otherwise will be an air region. Poling should be conducted at the highest possible poling field below the silicon oil and the polymer's breakdown voltage, in the vicinity of the glass transition temperature of the polymer. In a typical poling sequence, the temperature of the nonlinear polymer would be raised to above the glass transition temperature and a voltage would be applied to the electrodes 28 and 32. For a given electric field, the poling voltage is proportional to the spacing between electrodes 28 and 32. The poling orients the chromophores in a preferential direction parallel to the plane of the film and induces a large nonlinear coefficient parallel to the substrate. After poling the polymer at elevated temperatures for a set period of time, the temperature of the polymer is gradually decreased while keeping the applied voltage constant. After cooling to a sufficiently low temperature, the poling voltage is removed. The device is then removed from the silicon oil bath and the excess silicon oil is removed with isopropanol, de-ionized water and compressed air.

Note that, if a device fails, it is most likely to fail in the polymer layer. By using polymer layers in accordance with the present invention, if failure occurs the polymer layer can be removed and replaced. Further, if the operating optical wavelength changes, the dip can be moved by changing or trimming down the polymer layer.

Figure 7:
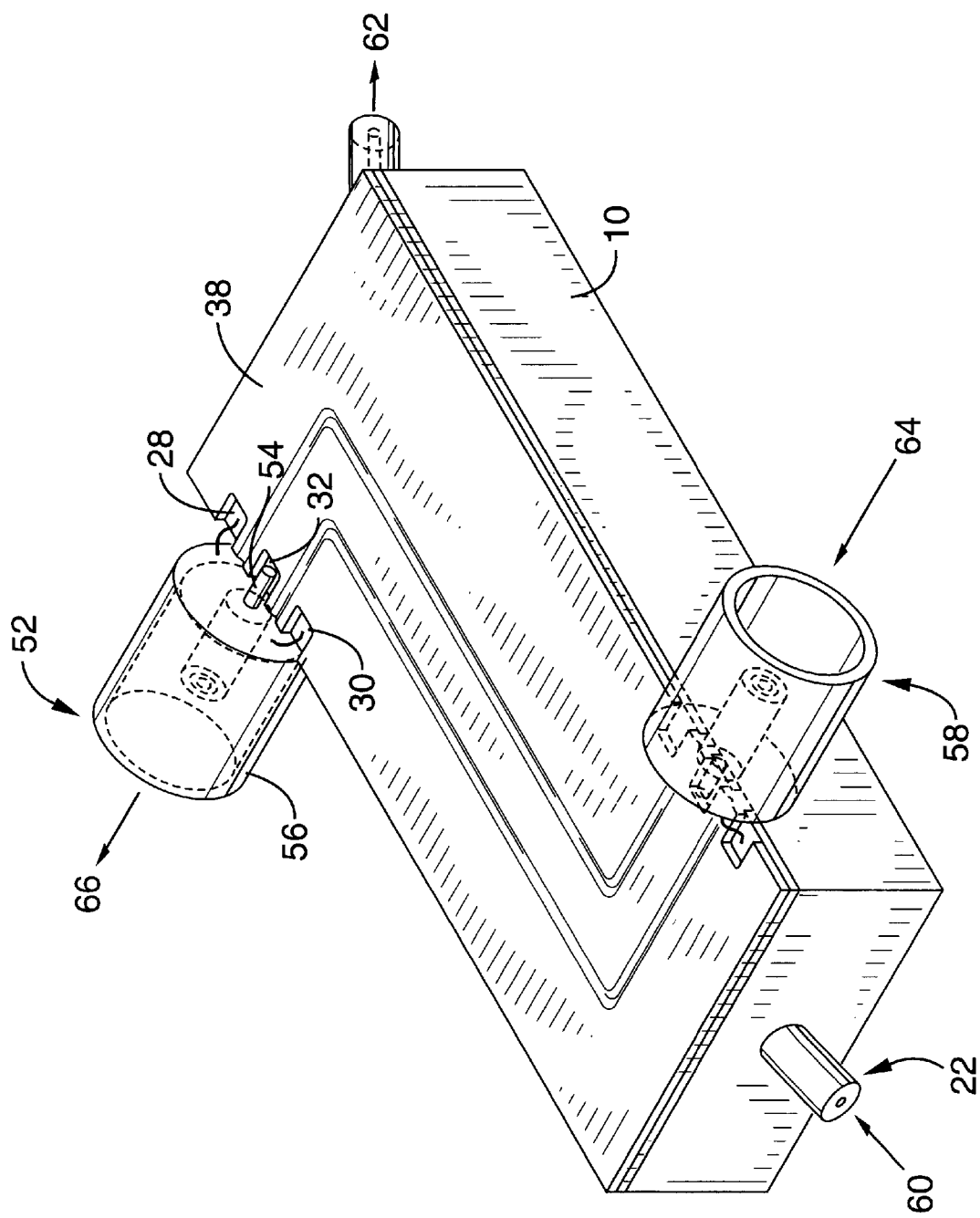
FIG. 7 is a perspective view of the apparatus shown in FIG. 2 with the hidden lines removed and illustrating the connection of coaxial connectors to the electrodes.

It will be appreciated that the electrodes need to be coupled to an RF source, and this can be achieved by using microwave coaxial connectors, waveguides, wire bonding and like conventional connection techniques. Referring to FIG. 7 for illustration purposes, input and output connections are provided using microwave coaxial or like connectors attached to the electrodes. For example, an output connector 52 is attached by soldering the center conductor 54 to signal electrode 32, and by soldering the barrel portion 56 of connector 52 to the ground electrodes 28, 30. Similarly, an input connector 58 is attached to the other end of the electrodes as shown. Accordingly, the completed device would have an optical input 60, an optical output 62, and modulating signal input 64 and a modulating signal output 66. Modulation is achieved by applying an RF signal to the modulating electrodes so as to alter the phase matching conditions between the optic fiber and the polymer waveguide via the linear electro-optic effect in the nonlinear polymer. Because polymers are being employed in the present invention, due to the low permittivity dispersion the modulation bandwidth of the device is essentially limited only by the electrode structure.

Figure 8:
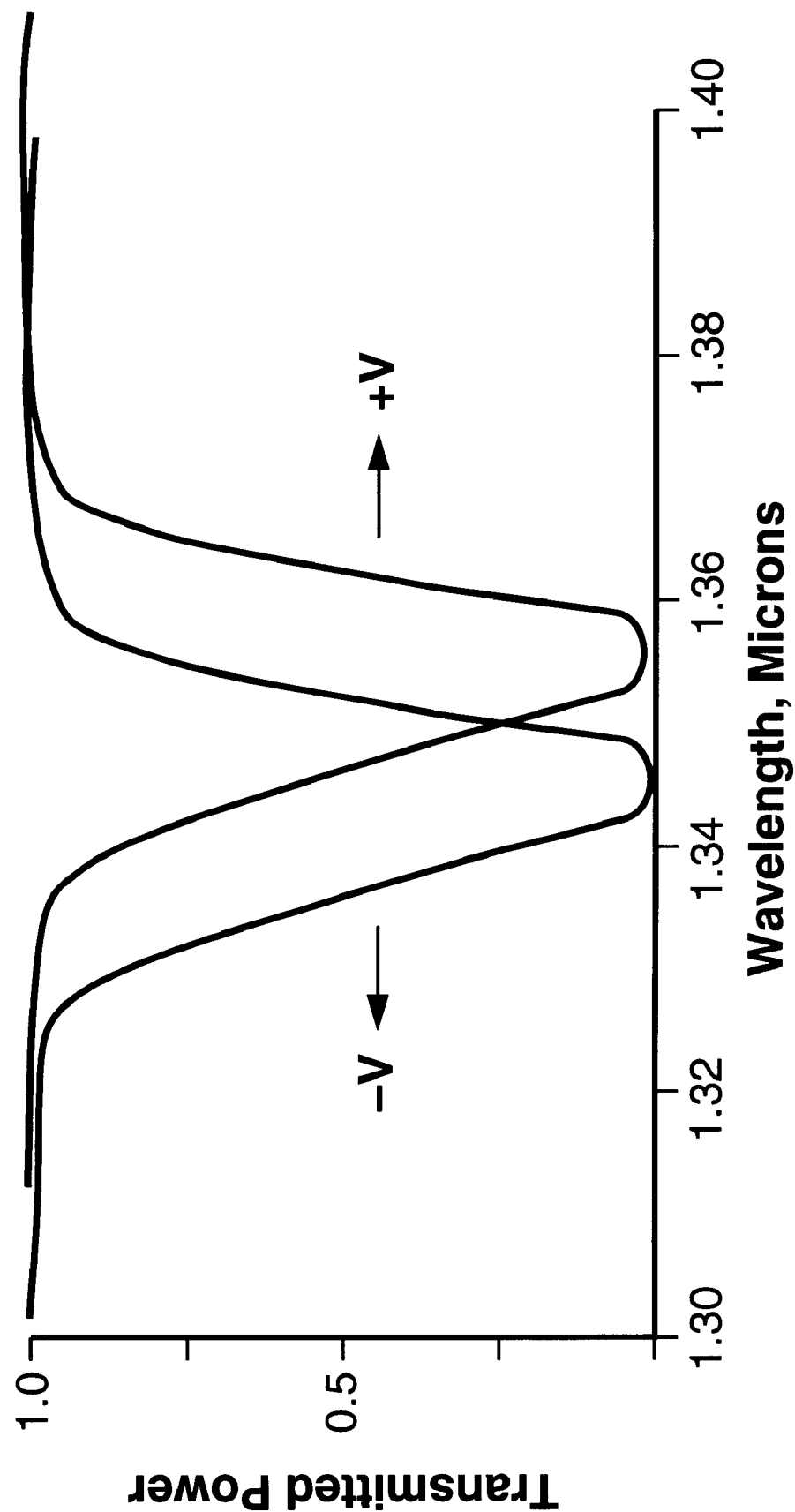
FIG. 8 is a graph showing the typical spectrum of transmitted power versus wavelength for a modulator in accordance with the present invention, showing the dip due to phase matched evanescent coupling, with the two curves showing the effects of voltage tuning of the phase matching wavelength.

Transfer of optical power in the device occurs in coupling region 26 only for matched wavelengths of light that have the same effective index of refraction in the inner core 24 as in the polymer waveguide overlay 38. Furthermore, polarized light is preferred for best interaction. Under phase-matched conditions, the transfer of optical power is efficient enough to deplete the intensity of a band of wavelengths centered around the exact phase matching wavelength. This causes a sharp narrow dip in the optical fiber transmission spectrum with a center wavelength that can be electro-optically tuned, since the phase matching wavelength is a function of the index of refraction of the polymer waveguide 38. FIG. 8 illustrates such a dip and shows how it can be tuned by an external electric field. Test results have shown dips with attenuations of greater than 30 dB.

Figure 9:
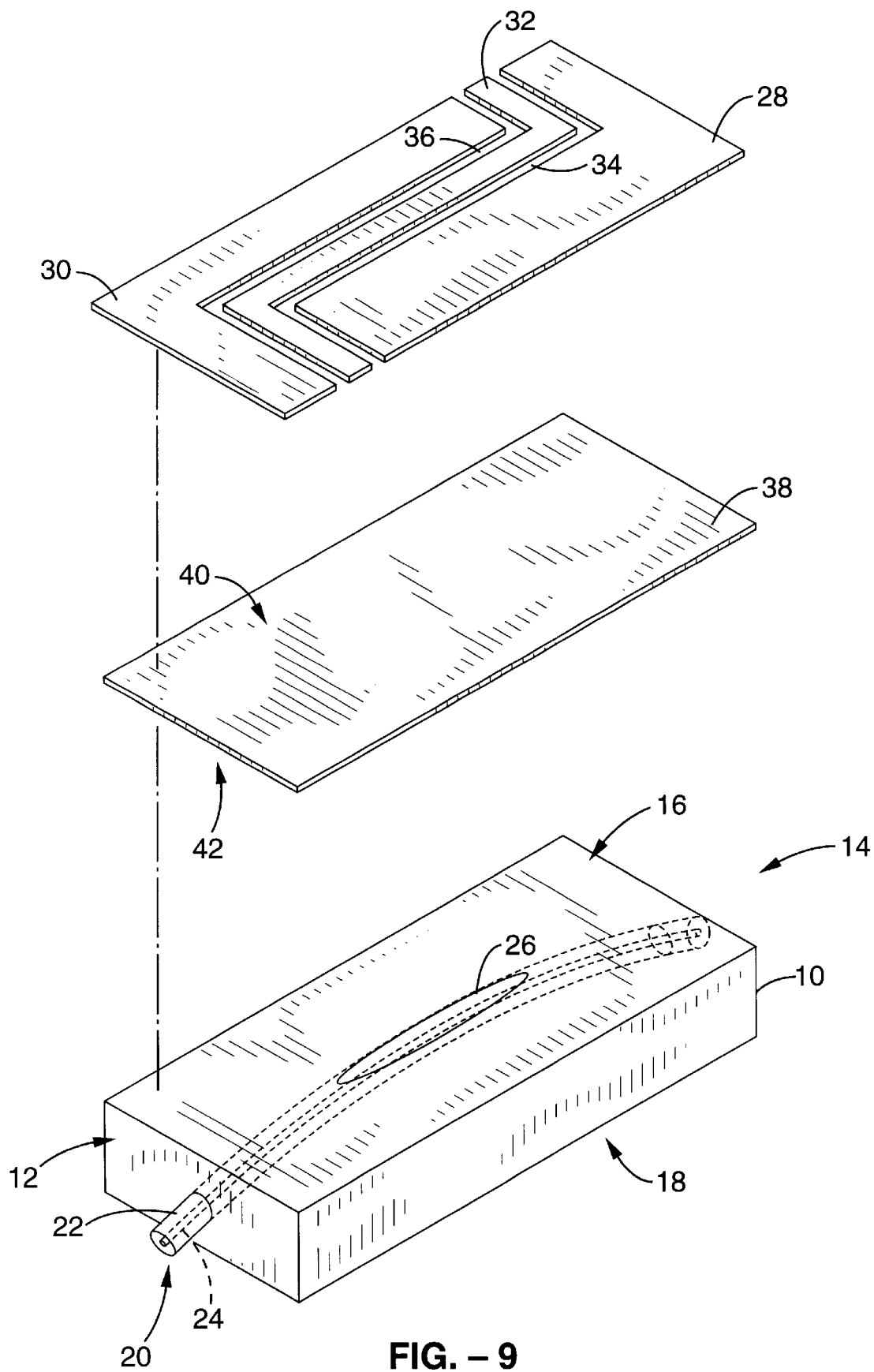
FIG. 9 is an exploded view of an alternative embodiment of an in-line polymeric electro-optic construct in accordance with the present invention wherein the positioning of the electrodes and polymer layer have been interchanged.

Referring now to FIG. 9, an alternative embodiment of the invention is shown wherein polymer layer 38 has been deposited directly on the fiber half-coupler substrate and the electrodes 28, 30 and 32 are deposited onto the polymer layer 38. This configuration will function is the same manner as described above, although the electric fields in the first embodiment will be stronger and is thus preferred.

Devices in accordance with the present invention can be used as modulators, wavelength filters, or switches. For example, operation as an optical intensity modulator for a fixed wavelength narrow band laser source is readily achieved by biasing the modulator with a voltage to bring the sloping region of one of the transmission dips in coincidence with the laser wavelength and then superimposing the modulation signal on the bias voltage. The signal strength in this instance will be proportional to the first derivative of the dip profile. In such a modulator configuration, due to the short coupling region and because only the light that is coupled out of the fiber propagates into the polymer layer, absorption coefficients of over 100 dB/cm can be tolerated in the EO polymer materials. This enables the use of EO polymers with strong resonant enhancement of the EO coefficients.

Operation as a wavelength filter is achieved by supplying a sufficient control voltage to move the dip location to the wavelength of interest. Over 30 dB attenuation of light at the selected wavelength can thus be obtained. Discrimination between adjacent WDM channels depends on the dip width relative to the WDM channel spacing. The dip width and depth are functions of the strength of the evanescent coupling and the length of the coupling region.

A wavelength selective fiber coupler switch can also be formed using two devices of the present invention on a common substrate. A channel waveguide in the EO polymer layer would be added to connect the coupling regions in such a way that light coupled out of one fiber is coupled back into the other fiber. The two devices would be tuned in tandem using separate control voltages so that the phase matching wavelengths of both are coincident.

EXAMPLE 1

Figure 10:
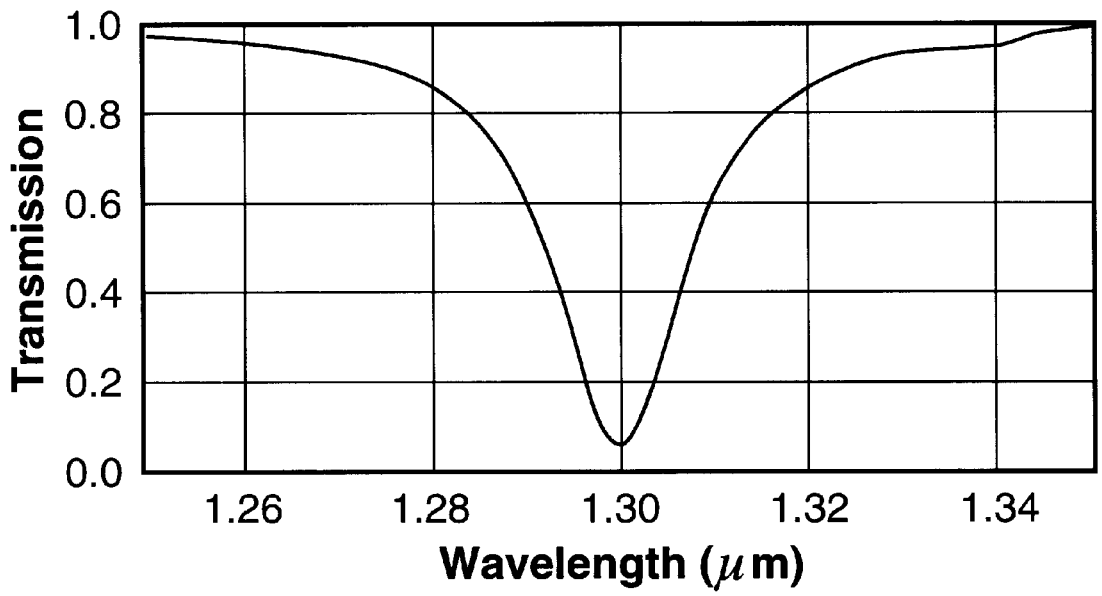
FIG. 10 is a graph showing the typical transmission spectrum for a modulator in accordance with the present invention.

Multiple modulators in accordance with the present invention were fabricated with the well known EO polymer poly(DR1-MMA) with an estimated $r_{33}$ of 10 pm/V using spin coating. These devices exhibited good reproducibility at optical fiber communications wavelengths. FIG. 10 shows a typical transmission spectrum for such a modulator.

EXAMPLE 2

Figure 11:
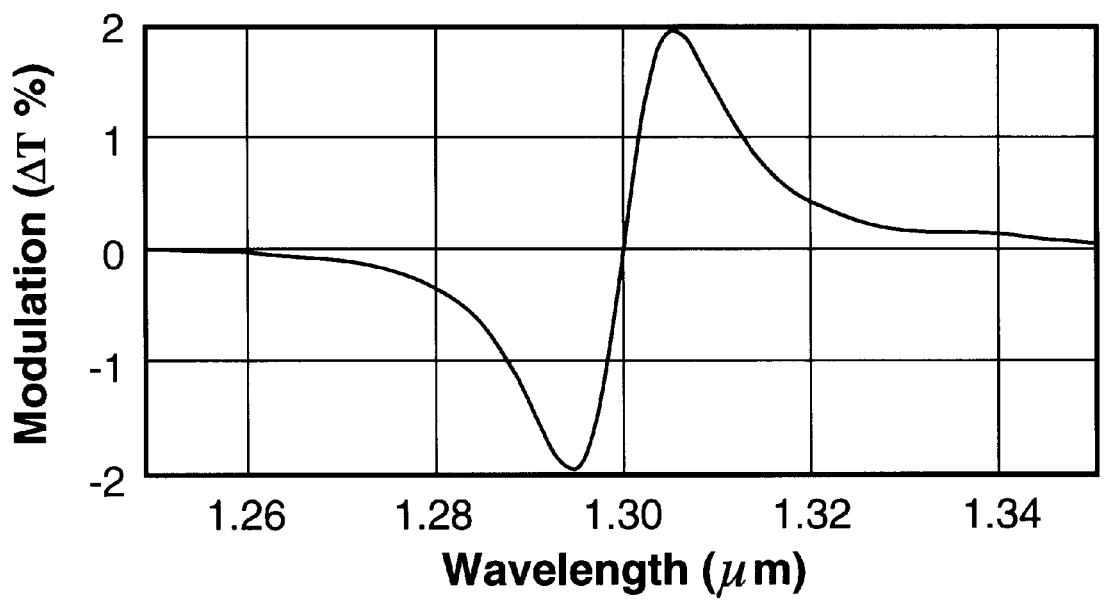
FIG. 11 is a graph showing the typical modulation characteristics as a function of wavelength for a modulator in accordance with the present invention.

The modulation in percent, defined as a change in transmission divided by the transmission (−T/T), for modulator in accordance with the present invention is shown in FIG. 11.

EXAMPLE 3

Figure 12:
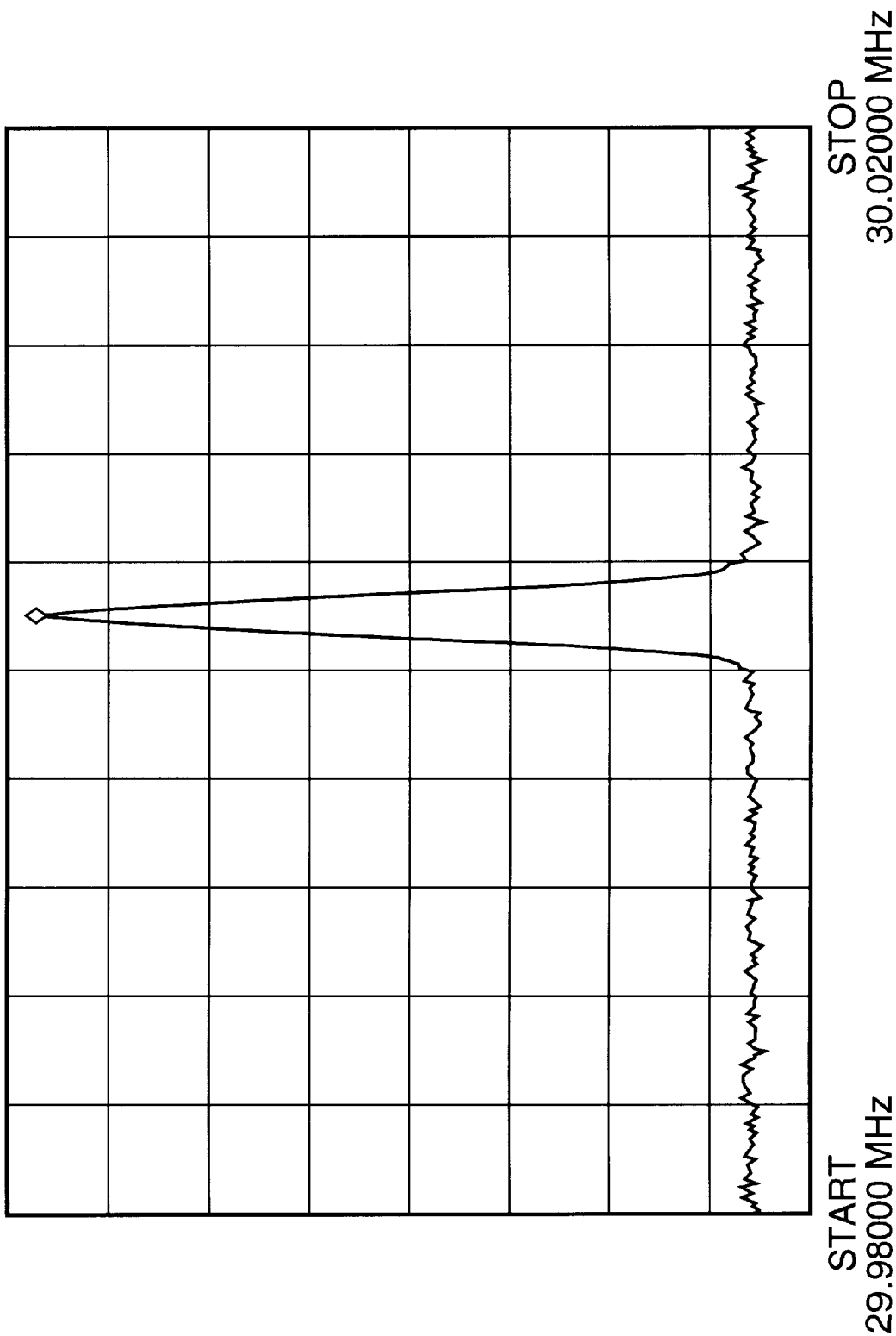
FIG. 12 is a graph showing an RF spectral scan of an amplitude modulated optical signal for a modulator in accordance with the present invention.

FIG. 12 shows an exemplary RF spectral scan of an amplitude modulated optical signal for a modulator in accordance with the present invention driven by a 30 MHz RF source.

EXAMPLE 4

The modulation characteristics of the present invention are governed by the change in refractive index of the polymer introduced by the electro-optic effect. This change of index is given by:

$$\Delta n = 1/2 n^3 r_{33} E$$

where n is the refractive index of the polymer layer and E is the applied electric field. clearly, a large change in index (and therefore a large modulation) can be achieved with either a large electric field or a large electro-optic coefficient $r_{33}$. Taking the already achieved modulation results as a benchmark, it is clear that at least a 10-fold increase in $r_{33}$ is necessary in order to be able to achieve efficient modulation with drive voltages on the order of 1.5 V. Although modulators in accordance with the present invention have compelling cost advantages, efficient modulation at such low drive voltages is needed in order to be fully competitive in performance with conventional lithium niobate integrated optic modulator devices. In order to achieve this competitive performance, an improved EO polymer with an $r_{33}$ on the order of 100 pm/V would be required.

Accordingly, it will be seen that this invention provides for EO polymer device technology based on evanescent coupling from a fiber half-coupler, D-fiber or the like to a nonlinear polymer waveguide. The technology exhibits low distortion characteristics as a direct result of a non-sinusoidal optical transfer function. Furthermore, the present invention exhibits the following additional characteristics and advantages:

Optical Advantages:

1. No lossy electrodes (metal, ITO, or other) in the optical path. Previously developed electrode geometries, such as microstrip or sandwich geometries, place electrodes in the optical path which results in increased optical losses. Also, when operated on the edge of a transmission dip, the modulation efficiency is proportional to the slope of that edge. Optical losses in the structure increase the width of a dip and decrease the slope, thereby decreasing the attainable modulation. In the coplanar electrode structure of the present invention, however, the electrode gap is aligned over the fiber core instead of the electrodes being placed in the optical path and, therefore, the invention minimizes the optical losses in the device and allows the maximum modulation to be achieved.

2. Light interacts with the largest electro-optic coefficient. In the coplanar electrode geometry of the present invention, a nonlinear polymer is poled in the plane of the film which is the optimum orientation of the nonlinear coefficients with respect to the incident light. With this poling geometry and a fiber mode with its electric field parallel to the electro-optic layer, the incident light will interact entirely with the largest electro-optic coefficient, $r_{33}$. This will result in the maximum achievable index change for a given nonlinear polymer and applied voltage and therefore result in the maximum modulation of the device geometry.

3. Capability of utilizing resonantly enhanced nonlinear polymers. The strict requirement for transparency in conventional planar waveguide devices is avoided in the present invention because the optical energy is evanescently coupled over a limited distance to the polymer rather than directly propagated through the polymer. Therefore, a modulator in accordance with the present invention is able to operate with considerably larger losses in the polymer layer than traditional modulators. This permits the modulator to operate closer to the absorption band of the nonlinear polymer, while taking advantage of the resonantly enhanced electro-optic coefficients. As the operating point approaches the absorption band of the polymer, the electro-optic coefficients increase. Taking advantage of resonantly enhanced electro-optic coefficients in nonlinear polymers will allow increased modulation.

4. Ruggedness, low insertion losses, and low cost. Pigtailing of fibers to integrated optics devices is a major contributor to insertion losses, fragility, and cost. The self-pigtailed design of the present invention eliminates the need for traditional fiber pigtailing and results in rugged device with greatly reduced insertion losses that can be produced for a fraction of the cost of a standard pigtailed integrated optics device.

5. Compact, integrable devices. The evanescently coupled design of the present invention permits fabrication of extremely small modulators. The device size is primarily limited by the size of the interaction region, which is approximately 1 mm long. In addition, multiple devices can be fabricated on a single substrate. This can result in compact multiple-device structures and greatly increases the usefulness of this device.

High Frequency Advantages of the CPW-PILFM Structure

1. High frequency performance up to 100 GHz. The coplanar transmission line employed in the present invention is surrounded by almost similar dielectric regions which offer high frequency performance. In comparison to a microstrip transmission line, the impedance of the transmission line ($Z_0$) is relatively insensitive to conductor width and thickness, electro-optic thickness height, coplanar gap, or surface roughness. From computer simulations with a nominal 3.0 Tm thick nonlinear polymer layer, the $Z_0$ of the present invention:

(a) changes approximately 1% for a 50.0 Tm change in conductor width, while the $Z_0$ of the microstrip changes approximately 6% for a 1.0 Tm change in conductor width;

(b) changes approximately 1% for a 1.0 Tm change in conductor thickness, while the $Z_0$ of microstrip changes approximately 2% for a 1.0 Tm change in the conductor thickness; and (c) is insensitive to change in dielectic height, while the $Z_0$ of microstrip changes approximately 10% for a 0.5 Tm change in dielectric height.

2. Low loss transition to high frequency connectors. Connecting the coplanar transmission structure of the present invention is straightforward with commercially available connectors.

Process Advantages of the CPW-PILFM Structure:

1. Simplicity of Fabrication. The number of processing steps, particularly lithographic steps, directly influences the device yield. The coplanar structure of the present invention can be implemented with three or fewer photolithography patterning steps.

2. Alignment of RF transmission lines over the fiber core. In-situ alignment using light propagating through the fiber guarantees that the waveguide gap is precisely aligned over the exposed core.

3. Separation of incompatible processing steps. All processing steps are independent of other processes. The photolithography steps are completed before the EO polymer layer is deposited onto the device. This results in an elimination of concerns relating to incompatibility of the EO polymer layer with the photolithographic chemicals.

4. Self-assembled monolayers to adhere polymer layers to the gold electrodes. Self-assembled monolayers (formed, for example, from a hydroxyalkanethiol or a mercaptoalkanoic acid) on the surface of the gold electrodes can be used to control the hydrophilicity which is required to make the surface wet by water and to adhere the polymer layer to the gold surface. The molecules can be functionalized with groups that react with PAA. Also, the layers are thin so that they do not change the optical characteristics, and can be spontaneously formed on non-planar geometries and vertical surfaces. Further, the layers can be reformed in the event that overpayment of new or additional layers is desired.

5. Photopoling of the nonlinear polymer. Some nonlinear chromophores (for example, azobenzenes) can be oriented by light and thus be poled at low temperature in the presence of an electric field—i.e. photopoling. Photopoling in this device is particularly advantageous since, in the coplanar electrode geometry of the present invention, the nonlinear polymer is poled in the plane of the film. The polymer and the poled area is easily accessable with light incident normal to the plane while the poling electric field is applied to the coplanar electrodes. This poling could be performed at room temperature or at an elevated temperature where the conductivity of the polymer is sufficiently low as to maintain a large poling field.

Advantages of the EO Polymer Liftoff Deposition Process:

1. Predetermined and repeatable EO polymer thickness. The use of a temporary substrate in the lift-off deposition procedure enables the EO polymer thickness to be determined before deposition onto the final device substrate. In addition, multiple segments of the same film can be deposited onto multiple devices, ensuring identical thickness films on all devices.

2. Elimination of spin coating of fragile substrates. Spin coating is performed on a temporary substrate and the EO polymer film is then lifted-off and deposited onto the final device substrate. This results in the deposition of a high quality film onto the device without having to subject the half-coupler substrate to harsh spin coating. Direct spinning onto the half coupler could result in destruction of the half coupler due to the high spinning speeds required.

3. Remote poling of the EO polymer. The use of a temporary substrate means that the EO polymer can be poled before deposition onto the half coupler. This allows the device to be assembled with a prepoled EO polymer film and avoids the necessity of using special techniques to pole the EO polymer film after its deposition onto the metal electrodes. It will be appreciated, however, that the remote poling must be performed such that the poling occurs in the plane of the film.

4. Regeneration of the device. Since the polymer layer deposition is the last processing step and since the lift-off process is used, the device configuration lends itself to easy recycling/or reconditioning in the event that the EO-response fails.

Although the description above contains many specificities, these should not be construed as limiting the scope of the invention but as merely providing illustrations of some of the presently preferred embodiments of this invention. Thus the scope of this invention should be determined by the appended claims and their legal equivalents.

What is claimed is:

1. A method of fabricating an electro-optic construct from a substrate base having an arcuate optical fiber embedded therein, said optical fiber having an inner core surrounded covered by an outer cladding, said substrate base having a surface adjacent to which a portion of said cladding has been removed so as to form a coupling region wherein light transmitted through said optical fiber will pass through the surface of said substrate, comprising the steps of:

(a) depositing first and second spaced-apart coplanar electrodes on the surface of said substrate and aligning the gap between said electrodes over said coupling region; and (b) overlaying said electrodes with a compliant electro-optic material.

2. A method as recited in claim 1, wherein said waveguide has an index of refraction that is controlled by said electrodes and wherein light transmitted through said optical fiber is evanescently coupled to said waveguide through said coupling region.

3. A method as recited in claim 1, further comprising the step of spin coating said waveguide over said electrodes.

4. A method as recited in claim 1, further comprising the steps of:

(c) preparing said waveguide on a temporary substrate; and (d) transferring said waveguide to said electrodes.

5. A method of fabricating an electro-optic construct from a substrate base having an arcuate optical fiber embedded therein, said optical fiber having an inner core surrounded covered by an outer cladding, said substrate base having a surface adjacent to which a portion of said cladding has been removed so as to form a coupling region wherein light transmitted through said optical fiber will pass through the surface of said substrate base, comprising the steps of:

(a) depositing a compliant electro-optic material on the surface of said substrate base; and (b) depositing first and second spaced-apart coplanar electrodes on the surface of said waveguide and aligning the gap between said electrodes over said coupling region.

6. A method as recited in claim 5, wherein light transmitted through said optical fiber is evanescently coupled to said waveguide through said coupling region and wherein said waveguide has an index of refraction that is controlled by a modulating or control signal applied to said electrodes.

7. A method as recited in claim 5, further comprising the step of spin coating said waveguide onto said substrate base.

8. A method as recited in claim 5, further comprising the steps of:

(c) preparing said waveguide on a temporary substrate; and (d) transferring said waveguide to said substrate base.

* * * * *